United States Patent
Hommura et al.

(10) Patent No.: US 9,692,073 B2
(45) Date of Patent: Jun. 27, 2017

(54) ELECTROLYTE MATERIAL, LIQUID COMPOSITION AND MEMBRANE/ELECTRODE ASSEMBLY FOR POLYMER ELECTROLYTE FUEL CELL

(71) Applicant: ASAHI GLASS COMPANY, LIMITED, Chiyoda-ku (JP)

(72) Inventors: Satoru Hommura, Tokyo (JP); Susumu Saito, Tokyo (JP); Tetsuji Shimohira, Tokyo (JP); Atsushi Watakabe, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 322 days.

(21) Appl. No.: 14/505,283

(22) Filed: Oct. 2, 2014

(65) Prior Publication Data

US 2015/0030962 A1    Jan. 29, 2015

Related U.S. Application Data

(63) Continuation of application No. PCT/JP2013/060252, filed on Apr. 3, 2013.

(30) Foreign Application Priority Data

Apr. 16, 2012    (JP) ................. 2012-093118

(51) Int. Cl.
*B01J 39/20*    (2006.01)
*B01J 41/14*    (2006.01)
(Continued)

(52) U.S. Cl.
CPC ........... *H01M 8/1039* (2013.01); *B01J 39/20* (2013.01); *B01J 41/14* (2013.01); *C08F 214/184* (2013.01);
(Continued)

(58) Field of Classification Search
CPC ........ B01J 39/20; B01J 41/14; H01M 8/1039; C08F 214/184; C08J 5/2237
See application file for complete search history.

(56) References Cited

U.S. PATENT DOCUMENTS

| | | | |
|---|---|---|---|
| 2001/0018144 A1 | 8/2001 | Watakabe et al. | |
| 2002/0142207 A1 | 10/2002 | Watakabe et al. | |

(Continued)

FOREIGN PATENT DOCUMENTS

| | | |
|---|---|---|
| JP | 53-22580 | 3/1978 |
| JP | 2002-216804 | 8/2002 |

(Continued)

OTHER PUBLICATIONS

International Search Report issued Jul. 2, 2013, in PCT/JP2013/060252, filed Apr. 3, 2013.

*Primary Examiner* — Nicholas A Smith
(74) *Attorney, Agent, or Firm* — Oblon, McClelland, Maier & Neustadt, L.L.P.

(57) ABSTRACT

To provide a membrane/electrode assembly excellent in the power generation characteristics even under low or no humidity conditions or under high humidity conditions, and an electrolyte material suitable for a catalyst layer of the membrane/electrode assembly, an electrolyte material is used which comprises a polymer (H) having a unit (A) which has an ion exchange group and in which all hydrogen atoms (excluding H$^+$ of the ion exchange group) bonded to carbon atoms are substituted by fluorine atoms, a unit (B) which has a 5-membered ring and in which all hydrogen atoms bonded to carbon 10 atoms are substituted by fluorine atoms, and a unit (C) which has neither an ion exchange group nor a ring structure, has an ether bond, and has an ether equivalent of at most 350 as established by the following formula (I) and in which all hydrogen atoms bonded to carbon atoms are substituted by fluorine atoms:

(Continued)

Ether equivalent=the molecular weight of the monomer forming the unit (C)/the number of ether bonds in the monomer forming the unit (C) (I).

12 Claims, 1 Drawing Sheet

(51) Int. Cl.
| | |
|---|---|
| *H01M 8/10* | (2016.01) |
| *C08F 214/18* | (2006.01) |
| *C08J 5/22* | (2006.01) |
| *H01M 8/1039* | (2016.01) |
| *H01M 8/1023* | (2016.01) |
| *H01B 1/12* | (2006.01) |
| *H01M 8/1004* | (2016.01) |
| *H01M 4/86* | (2006.01) |
| *C08L 33/16* | (2006.01) |
| *H01M 4/92* | (2006.01) |
| *H01M 8/1018* | (2016.01) |

(52) U.S. Cl.
CPC ............ *C08J 5/2237* (2013.01); *H01B 1/122* (2013.01); *H01M 4/8668* (2013.01); *H01M 8/1004* (2013.01); *H01M 8/1023* (2013.01); *C08L 33/16* (2013.01); *H01M 4/926* (2013.01); *H01M 2008/1095* (2013.01); *H01M 2300/0082* (2013.01)

(56) References Cited

U.S. PATENT DOCUMENTS

| | | |
|---|---|---|
| 2002/0177067 A1 | 11/2002 | Kim |
| 2003/0198854 A1 | 10/2003 | Watakabe et al. |
| 2008/0014490 A1 | 1/2008 | Watakabe et al. |
| 2009/0227749 A1 | 9/2009 | Tayanagi et al. |
| 2011/0027677 A1* | 2/2011 | Hommura .............. C08J 5/2237 429/428 |

FOREIGN PATENT DOCUMENTS

| | | |
|---|---|---|
| JP | 2002-260705 | 9/2002 |
| JP | 2002-338634 | 11/2002 |
| JP | 2009-209365 | 9/2009 |
| JP | 2011-34769 | 2/2011 |
| WO | WO 2011/013578 | 2/2011 |
| WO | WO 2012/088166 | 6/2012 |
| WO | WO 2012/088176 | 6/2012 |

* cited by examiner

ELECTROLYTE MATERIAL, LIQUID COMPOSITION AND MEMBRANE/ELECTRODE ASSEMBLY FOR POLYMER ELECTROLYTE FUEL CELL

This application is a continuation of PCT Application No. PCT/JP2013/060252, filed on Apr. 3, 2013, which is based upon and claims the benefit of priority from Japanese Patent Application No. 2012-093118 filed on Apr. 16, 2012. The contents of those applications are incorporated herein by reference in their entireties.

TECHNICAL FIELD

The present invention relates to an electrolyte material for a polymer electrolyte fuel cell, a liquid composition comprising the electrolyte material, and a membrane/electrode assembly for a polymer electrolyte fuel cell containing the electrolyte material in a catalyst layer.

BACKGROUND ART

A polymer electrolyte fuel cell is required to be operated under low or no humidity conditions with a low relative humidity of reaction gas (fuel gas and oxidant gas) in order to simplify the fuel cell system or to reduce costs.

As an electrolyte material for a catalyst layer to present a membrane/electrode assembly for a polymer electrolyte fuel cell excellent in the power generation characteristics in low or no humidity conditions, the following one has been proposed.

An electrolyte material made of a polymer having a unit (A) which has two ion exchange groups and in which all hydrogen atoms (excluding $H^+$ of the ion exchange groups) bonded to carbon atoms are substituted by fluorine atoms, and a unit (B) which has a 5-membered ring and in which all hydrogen atoms bonded to carbon atoms are substituted by fluorine atoms (Patent Document 1).

However, a catalyst layer containing such an electrolyte material has a problem such that it is hard and brittle and thus is susceptible to cracking, as compared with a catalyst layer containing a conventional electrolyte material which has been commonly used and which is made of a polymer having a unit which has one ion exchange group and in which all hydrogen atoms (excluding $H^+$ of the ion exchange groups) bonded to carbon atoms are substituted by fluorine atoms, and a unit derived from tetrafluoroethylene (hereinafter referred to as TFE).

PRIOR ART DOCUMENT

Patent Document

Patent Document 1: WO2011/013578

DISCLOSURE OF INVENTION

Technical Problem

The present invention provides a membrane/electrode assembly which is excellent in the power generation characteristics even under low or no humidity conditions or under high humidity conditions, and which is less susceptible to cracking of a catalyst layer; an electrolyte material suitable for a catalyst layer of the membrane/electrode assembly; and a liquid composition suitable for formation of a catalyst layer of the membrane/electrode assembly.

Solution to Problem

The electrolyte material of the present invention comprises a polymer (H) having a unit (A) which has an ion exchange group and in which all hydrogen atoms (excluding $H^+$ of the ion exchange group) bonded to carbon atoms are substituted by fluorine atoms, a unit (B) which has a 5-membered ring and in which all hydrogen atoms bonded to carbon atoms are substituted by fluorine atoms, and a unit (C) which has neither an ion exchange group nor a ring structure, has an ether bond, and has an ether equivalent of at most 350 as established by the following formula (I) and in which all hydrogen atoms bonded to carbon atoms are substituted by fluorine atoms:

$$\text{Ether equivalent} = \text{the molecular weight of the monomer forming the unit } (C)/\text{the number of ether bonds in the monomer forming the unit } (C) \quad (I)$$

It is preferred that at least one type of the unit (C) is one member selected from the group consisting of a unit represented by the following formula (u31), a unit represented by the following formula (u32) and a unit represented by the following formula (u33):

(u31)

(u32)

(u33)

wherein v is an integer of from 0 to 3, w is 1 or 2, x is an integer of from 0 to 2, y is 1 or 2, and z is an integer of from 0 to 2.

The proportion of the unit (C) is preferably from 1 to 30 mol % in all units (100 mol %) constituting the polymer (H).

It is preferred that at least one type of the unit (B) is a unit represented by the following formula (u21):

(u21)

wherein each of $R^{11}$ and $R^{12}$ which are independent of each other, is a fluorine atom or a $C_{1-5}$ perfluoroalkyl group, and each of $R^{13}$ and $R^{14}$ which are independent of each other, is a fluorine atom, a $C_{1-5}$ perfluoroalkyl group or a $C_{1-5}$ perfluoroalkoxy group.

Each of $R^{13}$ and $R^{14}$ is preferably a fluorine atom.

It is preferred that at least one type of the unit represented by the formula (u21) is a unit represented by the following formula (u21-1):

(u21-1)

It is preferred that at least one type of the unit (A) is a unit having a group represented by the following formula (g1):

(g1)

wherein $Q^{21}$ is a perfluoroalkylene group which may have an etheric oxygen atom, $Q^{22}$ is a single bond or a perfluoroalkylene group which may have an etheric oxygen atom, $Y^2$ is a fluorine atom or a monovalent perfluoro organic group, $R^{f2}$ is a perfluoroalkyl group which may have an etheric oxygen atom, $X^2$ is an oxygen atom, a nitrogen atom or a carbon atom, provided that when $X^2$ is an oxygen atom, b=0, when $X^2$ is a nitrogen atom, b=1, and when $X^2$ is a carbon atom, b=2.

It is preferred that at least one type of the unit (A) is a unit represented by the following formula (u12):

(u12)

wherein q is 0 or 1.

Each of $Q^{21}$ and $Q^{22}$ which are independent of each other, is preferably a $C_{1-6}$ perfluoroalkylene group which may have an etheric oxygen atom.

At least one of $Q^{21}$ and $Q^{22}$ is preferably a $C_{1-6}$ perfluoroalkylene group which has an etheric oxygen atom.

It is preferred that the polymer (H) further has a unit derived from tetrafluoroethylene.

The liquid composition of the present invention comprises a dispersion medium and the electrolyte material of the present invention dispersed in the dispersion medium, wherein the dispersion medium contains an organic solvent having a hydroxy group.

The membrane/electrode assembly for a polymer electrolyte fuel cell of the present invention comprises an anode having a catalyst layer containing a proton conductive polymer, a cathode having a catalyst layer containing a proton conductive polymer, and a polymer electrolyte membrane disposed between the anode and the cathode, wherein the proton conductive polymer contained in the catalyst layer of at least one of the cathode and the anode is the electrolyte material of the present invention.

Advantageous Effects of Invention

The membrane/electrode assembly of the present invention is excellent in the power generation characteristics even under low or no humidity conditions or under high humidity conditions and is less susceptible to cracking of a catalyst layer.

The electrolyte material of the present invention is suitable for a catalyst layer of the membrane/electrode assembly of the present invention.

The liquid composition of the present invention is suitable for formation of a catalyst layer of the membrane/electrode assembly of the present invention.

DESCRIPTION OF EMBODIMENTS

In this specification, a unit represented by the formula (u1) will be referred to as a unit (u1). The same applies to units represented by other formulae.

In this specification, a compound represented by the formula (m1) will be referred to as a compound (m1). The same applies to compounds represented by other formulae.

In this specification, a group represented by the formula (g1) will be referred to as a group (g1). The same applies to groups represented by other formulae.

In this specification, a unit means a unit derived from a monomer formed by polymerization of the monomer. The unit may be a unit directly formed by the polymerization reaction, or may be a unit having part of the unit converted to another structure by treating the polymer.

In this specification, a monomer is a compound having a polymerizable carbon-carbon double bond.

In this specification, an ion exchange group is a group having $H^+$, a monovalent metal cation, an ammonium ion or the like. The ion exchange group may, for example, be a sulfonic acid group, a sulfonimide group or a sulfonmethide group.

In this specification, a precursor group is a group capable of being converted to an ion exchange group by a known treatment such as hydrolysis or treatment for conversion to an acid form. Such a precursor group may, for example, be a —$SO_2F$ group.

<Electrolyte Material>

The electrolyte material of the present invention comprises a specific polymer (H).

(Polymer (H))

The polymer (H) is a copolymer having a specific unit (A), a specific unit (B) and a specific unit (C), and as a case requires, other unit (D).

Unit (A):

The unit (A) is a unit which has an ion exchange group and in which all hydrogen atoms (excluding $H^+$ of the ion exchange group) bonded to carbon atoms are substituted by fluorine atoms.

The unit (A) may, for example, be a unit (A1) having one ion exchange group, or a unit (A2) having two ion exchange groups. The unit (A2) is preferred in that it is possible to suppress the water content to be low even when the electrical conductivity of the polymer (H) is increased, and a higher power generation performance can be obtained even under low or no humidity conditions, or under high humidity conditions.

Unit (A1):

The unit (A1) is preferably a unit (u11) in that the preparation of the polymer (H) is thereby easy, and the industrial operation is facilitated.

(u11)

$Q^1$ is a single bond or a perfluoroalkylene group which may have an etheric oxygen atom.

In a case where the perfluoroalkylene group as $Q^1$ has an etheric oxygen atom, it may have one or more such oxygen atoms. Further, such an oxygen atom may be inserted between the carbon atom-carbon atom bond of the perfluoroalkylene group, or may be inserted at the terminal of the carbon atom bond.

The perfluoroalkylene group may be linear or branched, and is preferably linear.

The number of carbon atoms in the perfluoroalkene group is preferably from 1 to 6, more preferably from 1 to 4. When the number of carbon atoms is at most 6, a decrease in the ion exchange capacity of the polymer (H) will be suppressed, and a decrease in the proton conductivity will be suppressed.

$Y^1$ is a fluorine atom or a monovalent perfluoroorganic group.

$Y^1$ is preferably a fluorine atom or a trifluoromethyl group.

$R^{f1}$ is a perfluoroalkyl group which may have an etheric oxygen atom.

The perfluoroalkyl group may be linear or branched, and is preferably linear. The number of carbon atoms in the perfluoroalkyl group is preferably from 1 to 6, more preferably from 1 to 4. The perfluoroalkyl group is preferably e.g. a perfluoromethyl group or a perfluoroethyl group.

$X^1$ is an oxygen atom, a nitrogen atom or a carbon atom, provided that when $X^1$ is an oxygen atom, a=0, when $X^1$ is a nitrogen atom, a=1, and when $X^1$ is a carbon atom, a=2.

—$SO_2X^1(SO_2R^{f1})_a$—$H^+$ may, for example, be a sulfonic acid group (—$SO_3^-H^+$ group), a sulfonimide group (—$SO_2N(SO_2R^{f1})^-H^+$ group) or a sulfonmethide group (—$SO_2C(SO_2R^{f1})_2)^-H^+$ group).

p is 0 or 1.

As the unit (u11), units (u11-1) to (u11-4) are preferred in that the preparation of the polymer (H) is thereby easy, and the industrial operation is facilitated.

(u11-1)

(u11-2)

(u11-3)

(u11-4)

Unit (A2)

The unit (A2) is preferably a unit having a group (g1), in that it is possible to suppress the water content to be low even when the electrical conductivity of the polymer (H) is increased, and a higher power generation performance can be obtained even under low or no humidity conditions, or under high humidity conditions.

(g1)

$Q^{21}$ is a perfluoroalkylene group which may have an etheric oxygen atom.

$Q^{22}$ is a single bond or a perfluoroalkylene group which may have an etheric oxygen atom.

In a case where the perfluoroalkylene group as $Q^{21}$ or $Q^{22}$ has an etheric oxygen atom, it may have one or more such oxygen atoms. Further, such an oxygen atom may be inserted between the carbon atom-carbon atom bond of the perfluoroalkylene group, or may be inserted at the terminal of the carbon atom bond.

The perfluoroalkylene group may be linear or branched, and is preferably linear.

The number of carbon atoms in the perfluoroalkene group is preferably from 1 to 6, more preferably from 1 to 4. When the number of carbon atoms is at most 6, the boiling point of the raw material fluorinated monomer tends to be low, and purification by distillation will be easy. Further, when the number of carbon atoms is at most 6, a decrease in the ion exchange capacity of the polymer (H) will be suppressed, and a decrease in the proton conductivity will be suppressed.

$Q^{22}$ is preferably a $C_{1-6}$ perfluoroalkylene group which may have an etheric oxygen atom. In a case where $Q^{22}$ is a $C_{1-6}$ perfluoroalkylene group which may have an etheric oxygen atom, the stability in power generation performance will be excellent when the polymer electrolyte fuel cell is operated over a long period of time, as compared with a case where $Q^{22}$ is a single bond.

It is preferred that at least one of $Q^{21}$ and $Q^{22}$ is a $C_{1-6}$ perfluoroalkylene group which has an etheric oxygen atom. A fluorinated monomer having a $C_{1-6}$ perfluoroalkylene group which has an etheric oxygen atom can be prepared without via a fluorination reaction by fluorine gas, whereby the yield is good, and the production is easy.

$Y^2$ is a fluorine atom or a monovalent perfluoroorganic group.

$Y^2$ is preferably a fluorine atom or a $C_{1-6}$ perfluoroalkyl group which may have an etheric oxygen atom.

$R^{f2}$ is a linear or branched perfluoroalkyl group which may have an etheric oxygen atom. The number of carbon atoms in the perfluoroalkyl group is preferably from 1 to 8, more preferably from 1 to 6. In a case where the group (g) has two or more $R^{f2}$ groups, the plurality of $R^{f2}$ groups may be the same or different from one another.

$X^2$ is an oxygen atom, a nitrogen atom or a carbon atom, provided that when $X^2$ is an oxygen atom, b=0, when $X^2$ is a nitrogen atom, b=1, and when $X^2$ is a carbon atom, b=2.

The —$SO_2X^2(SO_2R^{f2})_b$—$H^+$ group may, for example, be a sulfonic acid group (—$SO_3^-H^+$ group), a sulfonimide group (—$SO_2N(SO_2R^{f2})^-H^+$ group) or a sulfonmethide group (—$SO_2C(SO_2R^{f2})_2)^-H^+$ group). The unit (A2) is preferably a unit (u12) in that it is thereby possible to suppress the water content to be low even when the electrical conductivity of the polymer (H) is increased, and a higher power generation performance can be obtained even under low or no humidity conditions, or under high humidity conditions.

(u12)

wherein q is 0 or 1.

As the unit (u12), units (u12-1) to (u12-3) are preferred, and the unit (u12-1) is particularly preferred, in that the preparation of the polymer (H) is thereby easy, and the industrial operation is facilitated.

(u12-1)

(u12-2)

(u12-3)

The proportion of the unit (A) is suitably adjusted depending upon the desired ion exchange capacity of the polymer (H). For example, it is preferably from 7 to 60 mol %, more preferably from 10 to 50 mol %, in all units (100 mol %) constituting the polymer (H).

The proportion of the unit (A) is obtainable from the results of $^{19}$NMR measurement with respect to the polymer (F).

Unit (B):

The unit (B) is a unit which has a 5-membered ring and in which all hydrogen atoms bonded to carbon atoms are substituted by fluorine atoms.

The unit (B) may, for example, be a unit (B1) derived from the after-described monomer (b1) or a unit (B2) derived from the after-described monomer (b2).

Unit (B1):

The unit (B1) may, for example, be units (u21) to (u23), and is preferably the unit (u21) or the unit (u22), more preferably the unit (u21), in that the effect to further improve the electrode performance of the polymer (H) is thereby high.

(u21)

(u22)

(u23)

Each of $R^{11}$ and $R^{12}$ which are independent of each other, is a fluorine atom or a $C_{1-5}$ perfluoroalkyl group.

Each of $R^{13}$ and $R^{14}$ which are independent of each other, is a fluorine atom, a $C_{1-5}$ perfluoroalkyl group or a $C_{1-5}$ perfluoroalkoxy group. It is preferred that at least one of $R^{13}$ and $R^{14}$ is a fluorine atom, and it is more preferred that both of them are fluorine atoms, in view of high polymerizability.

The perfluoroalkyl group and the perfluoroalkoxy group may be linear or branched, but are preferably linear.

It is preferred that at least one of $R^{25}$ and $R^{26}$ is a fluorine atom, and it is more preferred that both of them are fluorine atoms, in view of high polymerizability.

Each of $R^{31}$ to $R^{35}$ is a fluorine atom, a $C_{1-6}$ perfluoroalkyl group or a $C_{2-6}$ perfluoroalkyl group having an etheric oxygen atom between a carbon-carbon bond. In a case where the perfluoroalkyl group has an etheric oxygen atom, the number of such oxygen atoms may be one or more. The perfluoroalkyl group may be linear or branched, but is preferably linear.

$R^{36}$ is a single bond, a $C_{1-6}$ perfluoroalkylene group or a $C_{2-6}$ perfluoroalkylene group having an etheric oxygen atom between a carbon-carbon bond. In a case where the perfluoroalkylene group has an etheric oxygen atom, the number of such oxygen atoms may be one or more. The perfluoroalkylene group may be linear or branched, but is preferably linear.

The unit (u21) is particularly preferably a unit (u21-1) in that the effect to further improve the electrode performance of the polymer (H) is thereby high.

The unit (u22) is particularly preferably a unit (u22-1) in view of easiness of preparation of the monomer.

(u21-1)

(u22-1)

Unit (B2):

The unit (B2) may, for example, be a unit (u24).

(u24)

Each of $R^{41}$ to $R^{46}$ which are independent of one another, is a monovalent perfluoroorganic group which may have an etheric oxygen atom, or a fluorine atom. The monovalent perfluoroorganic group is preferably a perfluoroalkyl group. In a case where the perfluoroalkyl group has an etheric oxygen atom, the number of such oxygen atoms may be one or more. Further, such an oxygen atom may be inserted between the carbon-carbon bond in the perfluoroalkyl group, or may be inserted at a carbon atom bond terminal. The perfluoroalkyl group may be linear or branched, but is preferably linear.

Each of $R^{41}$ to $R^{14}$ is more preferably a fluorine atom in view of high polymerizability.

The unit (u24) is particularly preferably a unit (u24-1) in view of easiness of preparation of the monomer.

(u24-1)

The proportion of the unit (B) is preferably from 10 to 85 mol %, more preferably from 30 to 70 mol %, in all units (100 mol %) constituting the polymer (H). When the proportion of the unit (B) is at least 30 mol %, the power generation characteristics of the catalyst layer under low or no humidity conditions will be further improved. When the proportion of the unit (B) is at most 70 mol %, the balance between the flexibility and the power generation characteristics of the catalyst layer under low or no humidity conditions will be good.

The proportion of the unit (B) is obtainable from the results of $^{19}$NMR measurement with respect to the polymer (F).

Unit (C):

The unit (C) is a unit which has neither an ion exchange group nor a ring structure, has an ether bond, and has an ether equivalent of at most 350 as established by the following formula (I) and in which all hydrogen atoms bonded to carbon atoms are substituted by fluorine atoms:

Ether equivalent=the molecular weight of the monomer forming the unit (C)/the number of ether bonds in the monomer forming the unit (C)    (I)

When the ether equivalent is at most 350, the catalyst layer containing an electrolyte material made of the polymer (H) tends to be flexible and tends to be less susceptible to cracking. The ether equivalent is preferably at most 300, more preferably at most 280. The lower limit value for the ether equivalent is not particularly limited, and is preferably at least 100 in view of easiness of preparation of the monomer.

The unit (C) is preferably a unit (u31), a unit (u32) or a unit (u33), in that the production of the monomer is thereby easy, and the industrial operation is facilitated.

wherein v is an integer of from 0 to 3, w is 1 or 2, x is an integer of from 0 to 2, y is 1 or 2, and z is an integer of from 0 to 2.

The proportion of the unit (C) is preferably from 1 to 30 mol %, more preferably from 3 to 30 mol %, further preferably from 10 to 20 mol %, in all units (100 mol %) constituting the polymer (H). When the proportion of the unit (C) is at least 1 mol %, the catalyst layer containing an electrolyte material made of the polymer (H) tends to be flexible and tends to be less susceptible to cracking, and when it is at least 3 mol %, the catalyst layer containing an electrolyte material made of the polymer (H) tends to be sufficiently flexible and tends to be further less susceptible to cracking. When the proportion of the unit (C) is at most 30 mol %, the balance between the flexibility and the power generation characteristics of the catalyst layer under low or no humidity conditions will be good.

The proportion of the unit (C) is obtainable from the results of $^{19}$NMR measurement with respect to the polymer (F).

Other Unit (D):

Other unit (D) is a unit derived from a monomer (d) which will be described later.

Such other unit (D) is particularly preferably a unit derived from TFE in that it is thereby possible to reduce the water content of the polymer (H).

The proportion of other unit (D) is preferably from 0 to 60 mol %, more preferably from 5 to 40 mol %, in all units (100 mol %) constituting the polymer (H).

The proportion of the unit (D) is obtainable from the results of $^{19}$NMR measurement with respect to the polymer (F).

Ion Exchange Capacity:

The ion exchange capacity of the polymer (H) is preferably from 0.9 to 2.4 meq/g dry resin, more preferably from 1.0 to 1.8 meq/g dry resin. When the ion exchange capacity is at least 1.0 meq/g dry resin, the polymer (H) has high electrical conductivity and accordingly when it is used as an electrolyte material for a catalyst layer of a polymer electrolyte fuel cell, sufficient cell output will be obtained. When the ion exchange capacity is at most 1.8 meq/g dry resin, preparation of the polymer (H) having a high molecular weight will be easy, and the polymer (H) will not be excessively swelled with water and thus, it is possible to prevent elution of the polymer (H) in electric power generation under high temperature and high humidity conditions.

In order to adjust the ion exchange capacity of the polymer (H) to be within the above range, the proportion of a monomer (a) at the time of preparing the after-described polymer (F) is adjusted. Specifically, it is important to control the monomer composition at the time of the polymerization, and for that purpose, it is necessary to determine the charge composition considering the polymerizabilities of monomers.

Further, when a plurality of monomers are to be reacted, it is possible to let the reaction proceed at a constant composition by successively or continuously adding a monomer having a higher reactivity.

(Method for Production of Polymer (H))

The polymer (H) is produced, for example, by converting precursor groups in the after-described polymer (F) to ion exchange groups.

Production of Polymer (F):

The polymer (F) is produced by polymerizing a specific monomer (a), a specific monomer (b), a specific monomer (c), and, as the case requires, other monomer (d).

Monomer (a):

The monomer (a) is a perfluoromonomer having a precursor group for an ion exchange group.

The monomer (a) may, for example, be a monomer (a1) having one precursor group, or a monomer (a2) having two precursor groups, and the monomer (a2) is preferred in that it is thereby possible to suppress the water content low even if the electrical conductivity of the polymer (H) is increased, and a higher power generation performance is obtainable even under low or no humidity conditions or under high humidity conditions.

Monomer (a1)

The monomer (a1) is preferably a monomer (m11), in that the preparation of the polymer (H) is thereby easy, and the industrial operation is facilitated.

$$CF_2=CF(CF_2)_pOCF_2—CFY^1-Q^1—SO_2F \quad (m11)$$

$Q^1$, $Y^1$ and p are as defined above for the unit (u11).

The compound (m11) is preferably compounds (m11-1) to (m11-4), in that the preparation of the polymer (H) is thereby easy, and the industrial operation is facilitated.

$$CF_2=CFOCF_2CF(CF_3)OCF_2CF_2—SO_2F \quad (m11-1)$$

$$CF_2=CFOCF_2CF_2—SO_2F \quad (m11-2)$$

$$CF_2=CFOCF_2CF_2CF_2CF_2—SO_2F \quad (m11-3)$$

$$CF_2=CFCF_2OCF_2CF_2—SO_2F \quad (m11-4)$$

Monomer (a2):

The monomer (a2) is preferably a unit having a group (g2), in that it is thereby possible to suppress the water content low even if the electrical conductivity of the polymer (H) is increased, and a higher power generation performance is obtainable even under low or no humidity conditions or under high humidity conditions.

(g2)

$Q^{21}$, $Q^{22}$ and $Y^2$ are as defined above for the group (g1).

The monomer (a2) is preferably a compound (m12), in that it is thereby possible to suppress the water content low even if the electrical conductivity of the polymer (H) is increased, and a higher power generation performance is obtainable even under low or no humidity conditions or under high humidity conditions.

(m12)

q is as defined above for the unit (u12).

The compound (m12) is preferably compounds (m12-1) to (m12-3), in that the preparation of the polymer (H) is thereby easy, and the industrial operation is facilitated.

(m12-1)

(m12-2)

(m12-3)

The compound (m12) can be prepared by a method disclosed in WO2007/013533, JP-A-2008-202039, etc.

Monomer (b):

The monomer (b) is a perfluoromonomer having a 5-membered ring.

The monomer (b) may be a perfluoromonomer having a 5-membered ring (hereinafter referred to also as a monomer (b1)) or a perfluoromonomer capable of forming a 5-membered ring by cyclopolymerization (hereinafter referred to also as a monomer (b2)).

The 5-membered ring is a cyclic perfluoroorganic group which may have one or two etheric oxygen atoms.

Monomer (b1):

A polymerizable carbon-carbon double bond in the monomer (b1) may be constituted by two adjacent carbon atoms constituting the 5-membered ring, may be constituted by one carbon atom constituting the 5-membered ring and one carbon atom adjacent thereto, present outside the 5-membered ring, or may be constituted by two adjacent carbon atoms present outside the 5-membered ring. The polymerizable carbon-carbon double bond constituted by two adjacent carbon atoms present outside the 5-membered ring may be bonded to the 5-membered ring by means of a bivalent perfluoroorganic group which may have an etheric oxygen atom (e.g. a perfluoroalkylene group which may have an etheric oxygen atom).

The monomer (b1) may, for example, be compounds (m21) to (m23), and is preferably the compound (m21) or the compound (m22), more preferably the compound (m21), in that the effect to further improve the electrode performance of the polymer (H) is thereby high.

(m21)

(m22)

(m23)

$R^{11}$ to $R^{14}$ are as defined above for the unit (u21).
$R^{21}$ to $R^{26}$ are as defined above for the unit (u22).
$R^{31}$ to $R^{36}$ are as defined above for the unit (u23).

The compound (m21) may, for example, be compounds (m21-1) to (m21-8), and is particularly preferably the compound (m21-1) in that the effect to further improve the electrode performance of the polymer (H) is thereby high.

(m21-1)

(m21-2)

(m21-3)

(m21-4)

(m21-5)

(m21-6)

(m21-7)

(m21-8)

The compound (m22) may, for example, be a compound (m22-1) or a compound (m22-2), and is particularly preferably the compound (m22-1) in view of easiness of preparation and high polymerizability.

(m22-1)

(m22-2)

The compound (m23) may, for example, be a compound (m23-1) or a compound (m23-2).

(m23-1)

(m23-2)

The compound (m21) can be prepared by a method disclosed in Macromolecule, vol. 26, number 22, 1993, p. 5829 to 5834, JP-A-6-92957, etc.

The compound (m22) can be prepared by a method disclosed in WO2000/056694, Izvestiya Akademii Nauk SSSR, Seriya Khimicheskaya, 1989, vol. 4, p. 938 to 942, etc.

The compound (m23) can be prepared by a method disclosed in JP-A-2006-241302, etc.

Monomer (b2):

The monomer (b2) may, for example, be a compound (m24).

(m24)

$R^{41}$ to $R^{46}$ are as defined above for the unit (u24).

The compound (m24) may, for example, be compounds (m24-1) to (m24-3), and is particularly preferably the compound (m24-1) in view of easiness of preparation of the monomer.

$CF_2=CF-O-CF_2-CF_2-CF=CF_2$ (m24-1)

$CF_2=CF-O-CF_2-CF(CF_3)-CF=CF_2$ (m24-2)

$CF_2=CF-O-CF(CF_3)-CF_2-CF=CF_2$ (m24-3)

The compound (m24) can be prepared by a method disclosed in Macromol. Symp., vol. 98, 1995, p. 753 to 767, etc.

Monomer (b3):

Further, as the monomer (b1), a perfluoromonomer (hereinafter sometimes referred to as a monomer (b3)) having at least two polymerizable carbon-carbon double bonds and having a 5-membered ring may also be used. By use of the monomer (b3), the molecular weight of the polymer (F) can be increased.

The monomer (b3) may, for example, be a compound (m25).

(m25)

$Q^3$ is a single bond, an oxygen atom or a $C_{1-10}$ perfluoroalkylene group which may have an etheric oxygen atom.

The compound (m25) is preferably compounds (m25-1) to (m25-6) in view of easiness of preparation and high polymerizability.

(m25-1)

(m25-2)

(m25-3)

(m25-4)

(m25-5)

(m25-6)

The amount of the monomer (b3) to be added is preferably from 0.001 to 20 mol % based on 100 mol % of all monomers (the total of the monomer (a), the monomer (b) and the monomer (c)) constituting the polymer (F). If it is less than 0.001 mol %, the effect to increase the molecular weight tends to be inadequate, and if it exceeds 20 mol %, production of the polymer (F) tends to be difficult due to the difference in reactivity among the monomer (a), the monomer (b) and the monomer (c).

Monomer (c):

The monomer (c) is a perfluoromonomer which has no ion exchange group, no precursor group or no ring structure, has an ether bond, and has an ether equivalent of at most 350 and which has only one polymerizable carbon-carbon double bond.

The monomer (c) is preferably compounds (m31) to (m33) in view of easiness of preparation of the monomer and easiness of the industrial operation.

$CF_2=CF-O(CF_2)_vCF_3$ (m31)

$CF_2=CF-(OCF_2CF(CF_3))_wO(CF_2)_xCF_3$ (m32)

$CF_2=CF-(OCF_2CF_2)_yO(CF_2)_zCF_3$ (m33)

v, w, x, y and z are as defined above for the units (u31) to (u33).

The following may be mentioned as specific examples of the monomer (c).

$CF_2=CF-OCF_2CF(CF_3)OCF_2CF_2CF_3$(ether equivalent: 216), $CF_2=CF-OCF_3$(ether equivalent: 166), $CF_2=CF-OCF_2CF_2OCF_2CF_2OCF_2CF_3$(ether equivalent: 149)

$CF_2=CF-OCF_2CF_2CF_3$(ether equivalent: 266)

$CF_2=CF-OCF_2CF_2OCF_2CF_2OCF_2OCF_3$(ether equivalent: 116)

$CF_2=CF-OCF_2OCF_2CF_2CF_3$(ether equivalent: 166)

$CF_2=CF-OCF_2OCF_2OCF_2OCF_3$(ether equivalent: 91)

$CF_2=CF-OCF_2OCF_3$(ether equivalent: 116)

$CF_2=CF-OCF_2(CF_2)_3OCF_3$(ether equivalent: 191)

$CF_2=CF-O[CF_2CF_2CF_2O]_nCF_2CF_2CF_3$(n=1, ether equivalent: 216)

$CF_2=CF-OCF_2CF_2OCF_2CF_2OCF_3$(ether equivalent: 133)

$CF_2=CF-OCF_2OCF_2CF_2OCF_3$(ether equivalent: 116)

$CF_2=CF-OCF_2OCF_2CF_3$(ether equivalent: 141)

$CF_2=CF-OCF_2CF_2OCF_2OCF_2OCF_3$(ether equivalent: 104)

$CF_2=CF-OCF_2CF_2CF_2O(CF_2)_3O(CF_2)_3OCF_2CF_3$(ether equivalent: 191)

$CF_2=CF-OCF_2CF_2OCF_2CF_2OCF_2CF_2OCF_2CF_2OCF_3$ (ether equivalent: 126)

$CF_2=CF-OCF_2CF_2OCF_2CF_2OCF_2CF_2OCF_3$(ether equivalent: 129)

$CF_2=CF-OCF_2CF_2CF_2O(CF_2)_3OCF_2CF_2CF_3$(ether equivalent: 199)

$CF_2=CF-OCF_2CF_2OCF_2OCF_2OCF_3$(ether equivalent: 96)

$CF_2=CF-OCF_2CF_2OCF_2OCF_2OCF_2OCF_3$ (ether equivalent: 91)

$CF_2=CF-OCF_2CF_2CF_2OCF_3$(ether equivalent: 166)

$CF_2=CF-OCF_2CF_2OCF_2OCF_3$(ether equivalent: 116)

$CF_2=CF-OCF_2CF_2OCF_3$(ether equivalent: 141)

$CF_2=CF-OCF_2CF_2OCF_2CF_3$(ether equivalent: 166)

$CF_2=CF-OCF_2CF_2OCF_2CF_2CF_3$(ether equivalent: 216)

Monomer (d):

The monomer (d) is a monomer other than the monomer (a), the monomer (b) and the monomer (c).

The monomer (d) may, for example, be TFE, chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl)ethylene (such as (perfluorobutyl)ethylene) or a (perfluoroalkyl)propene (such as 3-perfluorooctyl-1-propene). The monomer (d) is particularly preferably TFE. TFE has crystallinity and thus has an effect to prevent swelling when the polymer (H) absorbs water, and it is possible to reduce the water content of the polymer (H).

Further, as a monomer (d), a perfluoromonomer (hereinafter referred to also as a monomer (d1)) having at least two polymerizable carbon-carbon double bonds, may be used. By using the monomer (d1), it is possible to increase the molecular weight of the polymer (F).

The monomer (d1) may, for example, be a compound (m4) (provided that the compound (m24) is excluded).

$$CF_2=CF-Q^4-CF=CF_2 \quad (m4)$$

$Q^4$ is an oxygen atom, or a perfluoroalkylene group which has a linear or branched chain structure and which may have an etheric oxygen atom.

The compound (d1) is preferably compounds (m4-1) to (m4-3) in view of easy preparation.

$$CF_2=CFOCF=CF_2 \quad (m4-1)$$

$$CF_2=CFO(CF_2)_hOCF=CF_2 \quad (m4-2)$$

$$CF_2=CF[OCF_2CF(CF_3)]_iO(CF_2)_k[OCF(CF_3)CF_2]_jOCF=CF_2 \quad (m4-3)$$

Each of h and k is an integer of from 2 to 8, and each of i and j which are independent of each other, is an integer of 0 to 5, provided that i+j≥1.

The amount of the monomer (d1) to be added is preferably from 0.001 to 20 mol % based on 100 mol % of all monomers (total of the monomer (a), the monomer (b), the monomer (c) and the monomer (d)) constituting the polymer (F). If it is less than 0.001 mol %, the effect to increase the molecular weight tends to be inadequate, and if it exceeds 20 mol %, the production of the polymer (F) tends to be difficult due to the difference in reactivity from the monomer (a), the monomer (b) and the monomer (c).

Polymerization Method:

As the polymerization method, a known polymerization method may be mentioned such as a bulk polymerization method, a solution polymerization method, a suspension polymerization method or an emulsion polymerization method. Otherwise, polymerization may be carried out in liquid or supercritical carbon dioxide.

The polymerization is carried out under a condition to form radicals. The method to form radicals may, for example, be a method of applying a radiation such as ultraviolet rays, γ-rays or electron beams, or a method of adding a radical initiator.

The polymerization temperature is usually from 10 to 150° C. The radical initiator may, for example, be a bis (fluoroacyl)peroxide, a bis(chlorofluoroacyl)peroxide, a dialkyl peroxy dicarbonate, a diacyl peroxide, a peroxy ester, an azo compound or a persulfate, and a perfluoro compound such as a bis(fluoroacyl)peroxide is preferred from such a viewpoint that the polymer (F) substantially free from unstable terminal groups is thereby obtainable.

A solvent to be used for the solution polymerization method is preferably a solvent having a boiling point of from 20 to 350° C., more preferably a solvent having a boiling point of from 40 to 150° C. Such a solvent may, for example, be a perfluorotrialkylamine (such as perfluorotributylamine), a perfluorocarbon (such as perfluorohexane or perfluorooctane), a hydrofluorocarbon (such as 1H,4H-perfluorobutane or 1H-perfluorohexane), a hydrochlorofluorocarbon (such as 3,3-dichloro-1,1,1,2,2-pentafluoropropane or 1,3-dichloro-1,1,2,2,3-pentafluoropropane) or a hydrofluoroether (such as $CF_3CH_2OCF_2CF_2H$).

In the solution polymerization method, monomers, a radical initiator, etc. are added to a solvent, and radicals are formed in the solvent to carry out polymerization of the monomers. The monomers and the initiator may be added all at once, sequentially or continuously.

In the suspension polymerization method, water is used as a dispersion medium, and in the dispersion medium, monomers, a non-ionic radical initiator, etc. are added to let radicals form in the dispersion medium thereby to carry out polymerization of the monomers.

The non-ionic radical initiator may, for example, be a bis(fluoroacyl)peroxide, a bis(chlorofluoroacyl)peroxide, a dialkylperoxy dicarbonate, a diacyl peroxide, a peroxy ester, a dialkyl peroxide, a bis(fluoroalkyl)peroxide or an azo compound.

To the dispersion medium, the above-mentioned solvent as an assisting agent; a surfactant as a dispersion stabilizer to prevent agglomeration of suspended particles; a hydrocarbon compound (such as hexane or methanol) as a molecular-weight controlling agent, etc., may be added.

Conversion Method:

As a method of converting —$SO_2F$ groups to sulfonic acid groups (—$SO_3^-H^+$ groups), the following method (i) may be mentioned, and as a method of converting —$SO_2F$ groups to sulfonimide groups (—$SO_2N(SO_2R^f)^-H^+$ groups), the following method (ii) may be mentioned.

(i) A method of hydrolyzing —$SO_2F$ groups in the polymer (F) to a sulfonic acid salt and then converting the sulfonic acid salt to acid-form to obtain sulfonic acid groups.

(ii) A method of imidizing —$SO_2F$ groups in the polymer (F) to salt-form sulfonimide groups, followed by conversion to acid-form to form acid-form sulfonimide groups.

Method (i):

The hydrolysis is carried out, for example, by contacting the polymer (F) with a basic compound in a solvent. The basic compound may, for example, be sodium hydroxide or potassium hydroxide. The solvent may, for example, be water or a mixed solvent of water with a polar solvent. The polar solvent may, for example, be an alcohol (such as methanol or ethanol) or dimethylsulfoxide.

The conversion to acid-form may be carried out, for example, by contacting the polymer having a sulfonic acid salt with an aqueous solution of hydrochloric acid, sulfuric acid or the like.

The hydrolysis and conversion to acid-form are carried out usually at a temperature of from 0 to 120° C.

Method (ii):

As the imidation, the following methods may, for example, be mentioned.

(ii-1) A method of reacting —$SO_2F$ groups with $R^fSO_2NHM$.

(ii-2) A method of reacting —$SO_2F$ groups with $R^fSO_2NH_2$ in the presence of an alkali metal hydroxide, an alkali metal carbonate, MF, ammonia or a primary to tertiary amine.

(ii-3) A method of reacting —$SO_2F$ groups with $R^fSO_2NMSi(CH_3)_3$.

Here, M is an alkali metal or a primary to quaternary ammonium.

The conversion to acid-form is carried out by treating the polymer having salt-form sulfonimide groups with an acid (such as sulfuric acid, nitric acid or hydrochloric acid).

Further, the polymer (H) wherein ion exchange groups are sulfonimide groups may also be produced by polymerizing a monomer (a') having a sulfonimide group converted from a —$SO_2F$ group in the monomer (a), and the monomer (b), and as the case requires, the monomer (c).

The monomer (a') may be produced by adding chlorine or bromine to the carbon-carbon double bond in the monomer (a), and converting a —$SO_2F$ group to a sulfonimide group by the method (ii), followed by a dechlorination or debromination reaction by means of metallic zinc.

(Advantageous Effects)

The above-described electrolyte material of the present invention has the specific unit (A) and the specific unit (B), and accordingly a membrane/electrode assembly having a catalyst layer containing the electrolyte material can exhibit sufficient power generation characteristics (such as output voltage) even under low or no humidity conditions or under high humidity conditions. Particularly, under severe conditions such as under high temperature and low or no humidity conditions (cell temperature: at least 90° C., humidity: at most 30% RH), high power generation characteristics (such as output voltage) can be exhibited.

Further, the above-described electrolyte material of the present invention has the specific unit (C) containing an ether bond with a high degree of freedom in rotation in a specific proportion in a side chain, whereby even though it has the unit (B) with a rigid structure, the electrolyte material tends to be flexible, and the catalyst layer containing such an electrolyte material tends to be less susceptible to cracking.

<Liquid Composition>

The liquid composition of the present invention is a composition comprising a dispersion medium and the electrolyte material of the present invention dispersed in the dispersion medium.

The dispersion medium contains an organic solvent having a hydroxy group.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6-nonafluoro-1-hexanol, or 3,3,4,4,5,5,6,6,7,7,8,8-tridecafluoro-1-octanol.

As the organic solvent having a hydroxy group, one type may be used alone, or two or more types may be used as mixed.

The dispersion medium preferably contains water.

The proportion of water is preferably from 10 to 99 mass %, more preferably from 40 to 99 mass %, in the dispersion medium (100 mass %). Dispersibility of the electrolyte material in the dispersion medium can be improved by increasing the proportion of water.

The proportion of the organic solvent having a hydroxy group is preferably from 1 to 90 mass %, more preferably from 1 to 60 mass %, in the dispersion medium (100 mass %).

The proportion of the electrolyte material is preferably from 1 to 50 mass %, more preferably from 3 to 30 mass %, in the liquid composition (100 mass %).

With respect to a method of preparing the liquid composition, several reports have been made, and for example, the liquid composition can be prepared in accordance with a preparation method disclosed in JP-B-4-35226, JP-A-2001-504872, JP-A-2005-82749, WO2006/38928, JP-A-2004-519296, etc.

A specific method of preparing the liquid composition may be a method of applying shearing such as stirring to the electrolyte material in the dispersion medium under atmospheric pressure or in a state where it is sealed in an autoclave or the like. The preparation temperature is preferably from 0 to 250° C., more preferably from 20 to 150° C. As the case requires, shearing such as ultrasonic waves may be applied.

Further, in a case where shearing such as stirring is applied to a mixed liquid having the electrolyte material, an organic solvent and water mixed to obtain a liquid composition, shearing such as stirring may be applied to a mixed liquid obtained by adding an organic solvent and water all at once to the electrolyte material, or the organic solvent and water may be dividedly added to the electrolyte material several times, and shearing such as stirring is applied at intervals between the additions. For example, shearing such as stirring is applied to a mixed liquid having part of the organic solvent and part of water added to the electrolyte material, and then the rest of the organic solvent and water is added to the mixed liquid, and shearing such as stirring is applied again. Otherwise, only the organic solvent is added to the electrolyte material, and shearing such as stirring is added, and then only water is added, and shearing such as stirring is applied again.

The liquid composition of the present invention is suitably used for formation of a catalyst layer of a membrane/electrode assembly as described hereinafter.

<Membrane/Electrode Assembly>

Figure 1:
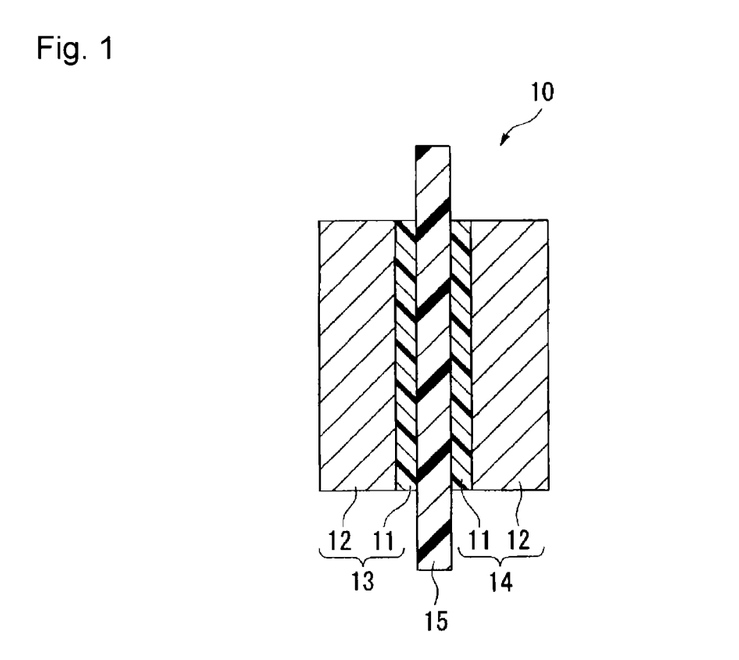
FIG. 1 is a cross section illustrating one example of a membrane/electrode assembly of the present invention.

FIG. 1 is a cross section illustrating one example of a membrane/electrode assembly (hereinafter referred to as a membrane/electrode assembly) for a polymer electrolyte fuel cell of the present invention. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and a proton conductive polymer.

The catalyst may be a supported catalyst having platinum or a platinum alloy supported on a carbon carrier.

The carbon carrier may, for example, be a carbon black powder.

The proton conductive polymer may be the electrolyte material of the present invention or a known electrolyte material. The proton conductive polymer contained in the catalyst layer of at least one of the cathode and the anode is the electrolyte material of the present invention, and it is preferred that the proton conductive polymer contained in the catalyst layer of the cathode is the electrolyte material of the present invention.

The catalyst layer 11 may contain a water-repellent agent with a view to increasing the effect to suppress flooding. The water-repellent agent may, for example, be a tetrafluoroethylene/hexafluoropropylene copolymer, a tetrafluoroethylene/perfluoro(alkyl vinyl ether) copolymer or polytetrafluoroethylene. The water-repellent agent is preferably a fluoropolymer soluble in a solvent, from such a viewpoint that the water repellent treatment of the catalyst layer 11 is easy. The amount of the water-repellent agent is preferably from 0.01 to 30 mass % in the catalyst layer (100 mass %).

As a method of forming the catalyst layer 11, the following methods may be mentioned.

Figure 2:
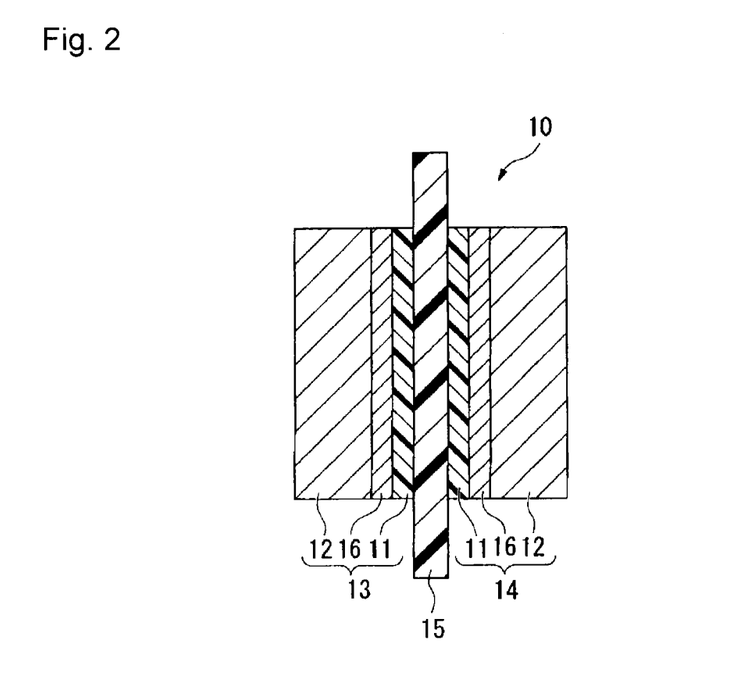
FIG. 2 is a cross section illustrating another example of a membrane/electrode assembly of the present invention.

(i) A method of applying a fluid for forming a catalyst layer on the polymer electrolyte membrane 15, the gas diffusion layer 12 or a carbon layer 16, followed by drying.

(ii) A method of applying a fluid for forming a catalyst layer on a substrate film, followed by drying to form a catalyst layer 11, and transferring the catalyst layer 11 to the polymer electrolyte membrane 15.

The fluid for forming a catalyst layer is a fluid comprising the electrolyte material and the catalyst dispersed in a dispersion medium. The fluid for forming a catalyst layer may be prepared, for example, by mixing the liquid composition of the present invention with a dispersion of the catalyst.

(Gas Diffusion Layer)

The gas diffusion layer 12 has a function to uniformly diffuse a gas into the catalyst layer 11 and a function as a current collector.

The gas diffusion layer 12 may, for example, be carbon paper, carbon cloth or carbon felt.

The gas diffusion layer 12 is preferably subjected to water repellent treatment e.g. with polytetrafluoroethylene.

(Carbon Layer)

The membrane/electrode assembly 10 may have a carbon layer 16 between the catalyst layer 11 and the gas diffusion layer 12 as shown in FIG. 2. By disposing the carbon layer 16, the gas diffusion properties on the surface of the catalyst layer 11 will be improved, and the power generation performance of the polymer electrolyte fuel cell will be remarkably improved.

The carbon layer 16 is a layer containing carbon (such as carbon powder or carbon nanofibers) and a nonionic fluoropolymer.

The nonionic fluoropolymer may, for example, be polytetrafluoroethylene.

(Polymer Electrolyte Membrane)

The polymer electrolyte membrane 15 is a membrane containing a proton conductive polymer.

The proton conductive polymer may be the electrolyte material of the present invention or a known electrolyte material. The known electrolyte material may, for example, be a polymer having the unit (A1) and a unit derived from TFE; or a polymer having the unit (A1), the unit (A2) and a unit derived from TFE.

The polymer electrolyte membrane 15 can be formed, for example, by a method (a casting method) wherein a liquid composition of the electrolyte material is applied on a substrate film or the catalyst layer 11, followed by drying.

The liquid composition is a dispersion having the electrolyte material dispersed in a dispersion medium containing an organic solvent having a hydroxy group and water.

In order to stabilize the polymer electrolyte membrane 15, it is preferred to carry out heat treatment. The temperature for the heat treatment is preferably from 130 to 200° C. although it depends also on the type of the electrolyte material. When the temperature for the heat treatment is at least 130° C., the electrolyte material will not excessively contain water. When the temperature for the heat treatment is at most 200° C., heat decomposition of ion exchange groups may be suppressed, and a decrease in the proton conductivity of the polymer electrolyte membrane 15 may be suppressed.

The polymer electrolyte membrane 15 may be treated with an aqueous hydrogen peroxide solution as the case requires.

The polymer electrolyte membrane 15 may be reinforced by a reinforcing material. The reinforcing material may, for example, be a porous body, fibers, woven fabric or nonwoven fabric. The material for the reinforcing material may, for example, be polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide.

The polymer electrolyte membrane 15 may contain at least one type of atoms selected from the group consisting of cerium and manganese in order to further improve the durability. Cerium and manganese will decompose hydrogen peroxide which is a substance to cause deterioration of the polymer electrolyte membrane 15. Such cerium or manganese is preferably present in the form of ions in the polymer electrolyte membrane 15, and so long as it is present in the form of ions, it may be present in any state in the polymer electrolyte membrane 15.

The polymer electrolyte membrane 15 may contain silica or a hetero polyacid (such as zirconium phosphate, phosphorus molybdic acid or phosphorus tungstic acid) as a water retention agent to prevent drying.

(Process for Producing Membrane/Electrode Assembly)

The membrane/electrode assembly 10 is produced, for example, by the following method.

(i) A method of forming catalyst layers 11 on a polymer electrolyte membrane 15 to form a membrane/catalyst layer assembly, and sandwiching such a membrane/catalyst layer assembly between gas diffusion layers 12.

(ii) A method of forming a catalyst layer 11 on a gas diffusion layer 12 to form electrodes (anode 13 and cathode 14), and sandwiching a polymer electrolyte membrane 15 between such electrodes.

In a case where the membrane/electrode assembly 10 has a carbon layer 16, the membrane/electrode assembly 10 is produced, for example, by the following method.

(i) A method of applying a dispersion containing carbon and a nonionic fluoropolymer on a substrate film, followed by drying to form a carbon layer 16, forming a catalyst layer 11 on the carbon layer 16, bonding such catalyst layers 11 to a polymer electrolyte membrane 15, separating the substrate films to form a membrane/catalyst layer assembly having the carbon layers 16, and sandwiching such a membrane/catalyst layer assembly between gas diffusion layers 12.

(ii) A method of applying a dispersion containing carbon and a nonionic fluoropolymer on a gas diffusion layer 12, followed by drying to form a carbon layer 16, and sandwiching a membrane/catalyst layer assembly having catalyst layers 11 formed on a polymer electrolyte membrane 15 between the gas diffusion layers 12 each having the carbon layer 16.

(Advantageous Effects)

The above-described membrane/electrode assembly 10 is excellent in the power generation characteristics even under low or no humidity conditions or under high humidity conditions since the catalyst layer 11 contains the electrolyte material of the present invention. Particularly, it is excellent in the power generation characteristics under severe conditions such as under high temperature and low or no humidity conditions.

<Polymer Electrolyte Fuel Cell>

The membrane/electrode assembly of the present invention is used for a polymer electrolyte fuel cell. A polymer electrolyte fuel cell is produced, for example, by sandwiching a membrane/electrode assembly between two separators to form a cell, and stacking a plurality of such cells.

As a separator, an electrically conductive carbon plate having grooves formed to constitute flow paths for a fuel gas or an oxidant gas containing oxygen (such as air or oxygen) may, for example, be mentioned.

As a type of the polymer electrolyte fuel cell, a hydrogen/oxygen type fuel cell or a direct methanol type fuel cell (DMFC) may, for example, be mentioned. Methanol or a methanol aqueous solution to be used as a fuel for DMFC may be a liquid feed or a gas feed.

EXAMPLES

Now, the present invention will be described in detail with reference to Examples. However, it should be understood that the present invention is by no means restricted to such specific Examples. Ex. 1 to 16 are Examples of the present invention, and Ex. 17 to 22 are Comparative Examples.

(Proportions of the Respective Units)

With respect to the proportions of the unit (A), the unit (B), the unit (C) and the unit derived from TFE, from the results of measurement of $^{19}$F-NMR with respect to the polymer (F), the proportions of the unit derived from the monomer (a), the unit derived from the monomer (b), the unit derived from the unit (c) and the unit derived from TFE, were obtained, and they were taken as the proportions of the unit (A), the unit (B), the unit (C) and the unit derived from TFE, in the polymer (H), respectively.

(Ion Exchange Capacity)

The ion exchange capacity of the polymer (H) was obtained by the following method.

The polymer (H) was put in a glove box and left to stand in an atmosphere into which dry nitrogen was blown for 24 hours or longer and dried. The dry mass of the polymer (H) was measured in the glove box.

The polymer (H) was immersed in a 2 mol/L sodium chloride aqueous solution and left to stand at 60° C. for one hour and then cooled to room temperature. The sodium chloride aqueous solution into which the polymer (H) had been immersed was titrated with a 0.5 mol/L sodium hydroxide aqueous solution to obtain the ion exchange capacity of the polymer (H).

(Cracking of Catalyst Layer)

A catalyst layer was visually observed, and cracking of the catalyst layer was evaluated under the following standards.

x: A crack is observed in the catalyst layer, and a part of the catalyst layer is peeled from the ETFE sheet.

○: A slight crack is observed in the catalyst layer, but the catalyst layer is fixed to the ETFE sheet.

⊚: No crack is observed in the catalyst layer, and the catalyst layer is fixed to the ETFE sheet.

(Power Generation Characteristics)

The membrane/electrode assembly was assembled into a cell for power generation, and the power generation characteristics were evaluated under the following conditions.

While the temperature of the membrane/electrode assembly was maintained at 95° C., hydrogen (utilization ratio: 50%) was supplied to the anode and air (utilization ratio: 50%) was supplied to the cathode, under a pressure of 175 kPa (absolute pressure). Both hydrogen and air were supplied under a relative humidity of 18% RH, and the cell voltage when the current density was 1.0 A/cm$^2$ was recorded and evaluated under the following standards.

⊚: Cell voltage being 0.55 V or higher.

○: Cell voltage being 0.5 V or higher and less than 0.55 V.

Δ: Cell voltage being 0.45 V or higher and less than 0.5 V.

x: Cell voltage being less than 0.45 V.

(Monomer (a))

Preparation of Compound (m12-1):

Compound (m12-1) was prepared in accordance with the method disclosed in Example 1 of JP-A-2008-202039.

Compound (m11-1)

$CF_2=CFOCF_2CF(CF_3)OCF_2CF_2-SO_2F$ (m11-1)

Compound (m11-2)

$CF_2=CFOCF_2CF_2-SO_2F$ (m11-2)

Compound (m11-4)

$CF_2=CFCF_2OCF_2CF_2-SO_2F$ (m11-4)

(Monomer (b))

Compound (m21-1):

(m21-1)

Compound (m22-1):

(m22-1)

Compound (m24-1):

(m24-1)

(Monomer (c))
Compound (m32-1):

$CF_2=CF-OCF_2CF(CF_3)OCF_2CF_2CF_3$(ether equivalent: 216) (m32-1)

Compound (m31-1):

$CF_2=CF-OCF_3$(ether equivalent: 166) (m31-1)

Compound (m33-1):

$CF_2=CF-OCF_2CF_2OCF_2CF_2OCF_2CF_3$(ether equivalent: 149) (m33-1)

Compound (m31-2):

$CF_2=CF-OCF_2CF_2CF_3$(ether equivalent: 266) (m31-2)

Compound (m3'):

$CF_2=CF-O(CF_2)_5CF_3$(ether equivalent: 416) (m3')

(Initiator):

Compound (i-1):

$(C_3F_7COO)_2$ (i-1)

Compound (i-2):

(i-2)

Compound (i-3):

(i-3)

(Solvent)
Compound (s-1):

$CClF_2CF_2CHClF$ (s-1)

Compound (s-2):

$CH_3OH$ (s-2)

PREPARATION EXAMPLES (Preparation of Liquid Composition)

In the same manner as in Ex. 5 disclosed at page 29 of WO2008/090990, polymer (F') made from the compounds (m12-1), (m11-1) and TFE, was obtained. Further, —SO₂F in the polymer (F') was converted to sulfonic acid groups in the same manner as in Ex. 1 given hereinafter, to obtain polymer (H'). The ion exchange capacity of the polymer (H') was 1.5 meq/g dry resin.

Into a hastelloy autoclave having an internal capacity of 2.5 L, 370 g of the polymer (H') was added, and further, a mixed solvent of water and ethanol (water/ethanol=50/50 mass ratio) was added to adjust the solid content concentration to 26 mass %. While stirring at a rotational speed of 150 rpm by means of double helical ribbon vanes, the temperature was raised to 120° C., and stirring was continued for 15 hours. Then, 200 g of water was added to adjust the solvent composition to water/ethanol=58/42 mass ratio and the solid content concentration to 23 mass %, and stirring was continued at a rotational speed of 150 rpm at 120° C. for one hour. Then, the rotational speed was lowered to 50 rpm, the system was cooled to room temperature over a period of about 5 hours. The solvent was added to adjust the solvent composition to water/ethanol=40/60/15 mass ratio and the solid content concentration to 15 mass %, to obtain a liquid composition (D') having the polymer (H') dispersed in the dispersion medium.

(Preparation of Polymer Electrolyte Membrane)

Using the liquid composition (D'), a polymer electrolyte membrane was prepared as follows.

The liquid composition (D') was applied on a sheet made of a copolymer of ethylene and TFE (trade name: Aflex 100N, manufactured by Asahi Glass Company, Limited, thickness: 100 μm) (hereinafter referred to as an ETFE sheet) by a die coater and dried at 80° C. for 30 minutes and further subjected to heat treatment at 185° C. for 30 minutes, to obtain a polymer electrolyte membrane having a thickness of 20 μm.

(Preparation of Catalyst Layer for Anode)

Using the liquid composition (D'), a catalyst layer for an anode was prepared as follows.

40 g of water and 18 g of ethanol were added to 10 g of a supported catalyst having 50 mass % of platinum supported on a carbon powder, followed by irradiation with ultrasonic waves for 10 minutes to obtain a dispersion of the catalyst. To the dispersion of the catalyst, 27 g of liquid composition (D') was added, and water and ethanol were further added to adjust the solid content concentration to 8 mass % and the solvent composition to ethanol/water=50/50

(mass ratio) to obtain a fluid for forming a catalyst layer. The fluid was applied on an ETFE sheet and dried at 80° C. for 30 minutes and further subjected to heat treatment at 160° C. for 30 minutes to form a catalyst layer for an anode having an amount of platinum of 0.1 mg/cm$^2$.

Ex. 1

(Preparation of Polymer (F))

Into a stainless steel autoclave having an internal capacity of 230 mL, 150.0 g of compound (m12-1), 29.6 g of compound (m32-1), 32.2 g of compound (m21-1) and 63.5 mg of compound (i-1) were charged, followed by sufficient deaeration under cooling with liquid nitrogen. Then, 8.9 g of TFE was introduced into the system, and the temperature was raised to 10° C. The pressure at that time was 0.15 MPaG (gauge pressure). After stirring at 10° C. for 48 hours, the gas in the system was purged, and the autoclave was returned to room temperature to terminate polymerization.

The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F-1). The yield was 42.3 g. The proportions of the respective units are shown in Table 1.

(Preparation of Polymer (H))

Polymer (F-1) was immersed in an aqueous solution containing 20 mass % of compound (s-2) and 15 mass % of potassium hydroxide for 40 hours to hydrolyze and convert —SO$_2$F groups in polymer (F-1) to —SO$_3$K groups. Then, the polymer was immersed in a 3 mol/L hydrochloric acid aqueous solution for 2 hours. The hydrochloric acid aqueous solution was changed, and the same treatment was further carried out four times to obtain polymer (H-1) having —SO$_3$K groups in the polymer converted to sulfonic acid groups. Polymer (H-1) was sufficiently washed with ultrapure water. The ion exchange capacity of polymer (H-1) is shown in Table 1.

(Preparation of Liquid Composition)

To polymer (H-1), a mixed solvent of 1-propanol, ethanol and water (1-propanol/ethanol/water=50/15/35 mass ratio) was added to adjust the solid content concentration to 23 mass %, followed by stirring using an autoclave at 130° C. for 10 hours. Further, these solvents were added to adjust the solvent composition to 1-propanol/ethanol/water=50/10/40 and the solid content concentration to 15 mass % thereby to obtain liquid composition (D-1) having polymer (H-1) dispersed in the dispersion medium.

(Preparation of Catalyst Layer for Cathode)

20 g of water and 20 g of ethanol were added to 6 g of a supported catalyst having 50 mass % of platinum supported on a carbon powder, followed by irradiation with ultrasonic waves for 10 minutes to obtain a dispersion of the catalyst. To the dispersion of the catalyst, 16 g of liquid composition (D-1) was added, and water, ethanol and 1-propanol were further added to adjust the solid content concentration to 9 mass % and the solvent composition to 1-propanol/ethanol/water=40/10/50 (mass ratio) to obtain a fluid for forming a catalyst layer. The fluid was applied on a separately prepared ETFE sheet and dried at 80° C. for 30 minutes and further subjected to heat treatment at 160° C. for 30 minutes to form catalyst layer (E-1) for a cathode having an amount of platinum of 0.2 mg/cm$^2$. The result of evaluation of cracking of the catalyst layer is shown in Table 5.

(Preparation of Membrane/Electrode Assembly)

The ETFE sheet was separated from the polymer electrolyte membrane, the polymer electrolyte membrane was sandwiched between the catalyst layer for the anode and the catalyst layer (E-1) for the cathode and heat pressed at a pressing temperature of 160° C. for a pressing time of 5 minutes under a pressure of 3 MPa to bond the catalyst layers on both sides of the polymer electrolyte membrane, and the ETFE sheets were separated from the catalyst layers to obtain a membrane/catalyst layer assembly having an electrode area of 25 cm$^2$.

On a gas diffusion layer made of carbon paper, a carbon layer comprising carbon and polytetrafluoroethylene was formed.

The membrane/catalyst layer assembly was sandwiched between the gas diffusion layers so that the carbon layer and the catalyst layer were in contact with each other, to obtain a membrane/electrode assembly. The result of evaluation of the power generation characteristics is shown in Table 5.

Ex. 2 to 14

Polymers (F-2) to (F-14), polymers (H-2) to (H-14), liquid compositions (D-2) to (D-14), catalyst layers (E-2) to (E-14) and membrane/electrode assemblies were obtained in the same manner as in Ex. 1 except that the types and amounts of the compounds and various conditions in Ex. 1 were changed as shown in Tables 1 and 2. The results are shown in Tables 1, 2 and 5.

Ex. 15

Into a stainless steel autoclave having an internal capacity of 230 mL, 231.0 g of compound (m11-4), 13.0 g of compound (m31-2), 8.5 g of compound (m21-1) and 25.3 mg of compound (i-2) were charged, followed by sufficient deaeration under cooling with liquid nitrogen. Then, the temperature was raised to 100° C., and TFE was introduced into the system and the pressure was maintained at 0.3 MPaG to initiate polymerization. During the polymerization, TFE was continuously added to maintain the pressure constant at 0.3 MPaG. Further, compound (m21-1) was continuously added at a rate of 1.0 g per hour. After 10 hours, the gas in the system was purged, and the autoclave was returned to room temperature to terminate the polymerization. After the polymerization, polymer (F-15), polymer (H-15), liquid composition (D-15), catalyst layer (E-15) and a membrane/electrode assembly were obtained in the same manner as in Ex. 1. The results are shown in Tables 3 and 5.

Ex. 16

Into a stainless steel autoclave having an internal capacity of 230 mL, 140.9 g of compound (m12-1), 32.4 g of compound (m32-1), 62.6 g of compound (m24-1) and 70.7 mg of compound (i-3) were charged, followed by sufficient deaeration under cooling with liquid nitrogen. Then, the temperature was raised to 40° C., and TFE was introduced into the system and the pressure was maintained at 0.1 MPaG to initiate polymerization. During the polymerization, TFE was continuously added to maintain the pressure constant at 0.1 MPaG. After 10 hours, the gas in the system was purged, and the autoclave was returned to room temperature to terminate the polymerization. After the polymerization, polymer (F-16), polymer (H-16), liquid composition (D-16), catalyst layer (E-16) and a membrane/electrode assembly were obtained in the same manner as in Ex. 1. The results are shown in Tables 3 and 5.

Ex. 17 to 20

Polymers (F-17) to (F-20), polymers (H-17) to (H-20), liquid compositions (D-17) to (D-20), catalyst layers (E-17) to (E-20) and membrane/electrode assemblies were obtained in the same manner as in Ex. 1 except that the types and amounts of the compounds and various conditions in Ex. 1 were changed as shown in Table 4. The results are shown in Tables 4 and 5.

Ex. 21

Polymer (F-21), polymer (H-21), liquid composition (D-21), catalyst layer (E-21) and a membrane/electrode assembly were obtained in the same manner as in Ex. 1 except that the types and amounts of the compounds and various conditions in Ex. 16 were changed as shown in Table 4. The results are shown in Tables 4 and 5.

Ex. 22

Polymer (F-22), polymer (H-22), liquid composition (D-22), catalyst layer (E-22) and a membrane/electrode assembly were obtained in the same manner as in Ex. 1 except that the types and amounts of the compounds and various conditions in Ex. 1 were changed as shown in Table 4. The results are shown in Tables 4 and 5.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Polymer (F) | F-1 | F-2 | F-3 | F-4 | F-5 | F-6 | F-7 | F-8 |
| Autoclave [mL] | 230 | 495 | 230 | 230 | 230 | 230 | 230 | 495 |
| Type of monomer (a) | m12-1 | m12-1 | m12-1 | m12-1 | m12-1 | m12-1 | m12-1 | m12-1 |
| Amount of monomer (a) [g] | 150.0 | 295.5 | 188.2 | 187.0 | 148.9 | 96.63 | 150.0 | 275.4 |
| Type of monomer (b) | m21-1 | m21-1 | m21-1 | m21-1 | m21-1 | m21-1 | m21-1 | m21-1 |
| Amount of monomer (b) [g] | 32.2 | 46.1 | 22.0 | 23.4 | 26.4 | 22.21 | 32.3 | 45.2 |
| Type of monomer (c) | m32-1 | m32-1 | m31-1 | m31-1 | m33-1 | m33-1 | m31-1 | m31-2 |
| Amount of monomer (c) [g] | 29.6 | 102.0 | 7.1 | 6.9 | 35.9 | 10.25 | 18.2 | 67.6 |
| Initiator | i-1 | i-1 | i-1 | i-1 | i-1 | i-1 | i-1 | i-1 |
| Amount of initiator [mg] | 63.5 | 133 | 64 | 65 | 63 | 39 | 60 | 117 |
| Polymer temperature [° C.] | 10 | 10 | 10 | 10 | 10 | 22 | 10 | 10 |
| Pressure [MPaG] | 0.15 | 0.04 | 0.21 | 0.10 | 0.11 | 0.24 | 0.16 | 0.04 |
| Polymerization time [hr] | 48 | 24 | 89 | 91 | 90 | 24 | 49 | 26 |
| Yield [g] | 42.3 | 31.2 | 35.1 | 25.4 | 28.2 | 36.9 | 42.2 | 26.2 |
| Proportion of unit (A) [mol %] | 13 | 16 | 15 | 24 | 18 | 15 | 12 | 15 |
| Proportion of unit (B) [mol %] | 47 | 49 | 60 | 59 | 60 | 47.5 | 48 | 52 |
| Proportion of unit (C) [mol %] | 5 | 12 | 12 | 12 | 12 | 2.5 | 6 | 12 |
| Proportion of TFE unit [mol %] | 35 | 23 | 13 | 5 | 10 | 35 | 34 | 21 |
| Polymer (H) | H-1 | H-2 | H-3 | H-4 | H-5 | H-6 | H-7 | H-8 |
| Ion exchange capacity [meq/g] | 1.0 | 1.1 | 1.1 | 1.5 | 1.1 | 1.2 | 1.0 | 1.1 |

TABLE 2

|  | Ex. 9 | Ex. 10 | Ex. 11 | Ex. 12 | Ex. 13 | Ex. 14 |
|---|---|---|---|---|---|---|
| Polymer (F) | F-9 | F-10 | F-11 | F-12 | F-13 | F-14 |
| Autoclave [mL] | 230 | 230 | 230 | 230 | 230 | 230 |
| Type of monomer (a) | m12-1 | m12-1 | m12-1 | m11-1 | m11-1 | m12-1 |
| Amount of monomer (a) [g] | 164.6 | 194.8 | 175.3 | 216.0 | 177.5 | 187.8 |
| Type of monomer (b) | m21-1 | m21-1 | m21-1 | m21-1 | m21-1 | m22-1 |
| Amount of monomer (b) [g] | 28.6 | 29.0 | 29.1 | 29.0 | 42.5 | 13.7 |
| Type of monomer (c) | m31-2 | m31-2 | m31-2 | m31-2 | m31-2 | m31-2 |
| Amount of monomer (c) [g] | 68.4 | 103.4 | 37.2 | 20.1 | 118.7 | 28.6 |
| Initiator | i-1 | i-1 | i-1 | i-1 | i-1 | i-1 |
| Amount of initiator [mg] | 79 | 98 | 73 | 80 | 102 | 68 |
| Polymer temperature [° C.] | 10 | 10 | 10 | 10 | 10 | 10 |
| Pressure [MPaG] | 0.10 | 0.03 | 0.03 | 0.10 | 0.04 | 0.02 |
| Polymerization time [hr] | 88 | 91 | 93 | 89 | 90 | 24 |
| Yield [g] | 35.4 | 23.2 | 30.4 | 29.1 | 15.0 | 21.5 |
| Proportion of unit (A) [mol %] | 17 | 16 | 21 | 32 | 28 | 23 |
| Proportion of unit (B) [mol %] | 55 | 51 | 60 | 50 | 50 | 60 |
| Proportion of unit (C) [mol %] | 23 | 30 | 15 | 5 | 19 | 12 |
| Proportion of TFE unit [mol %] | 5 | 3 | 4 | 13 | 3 | 5 |
| Polymer (H) | H-9 | H-10 | H-11 | H-12 | H-13 | H-14 |
| Ion exchange capacity [meq/g] | 1.1 | 1.0 | 1.3 | 1.1 | 1.1 | 1.4 |

TABLE 3

| | Ex. 15 | Ex. 16 |
|---|---|---|
| Polymer (F) | F-15 | F-16 |
| Autoclave [mL] | 230 | 230 |
| Type of monomer (a) | m11-4 | m12-1 |
| Amount of monomer (a) [g] | 231.0 | 140.9 |
| Type of monomer (b) | m21-1 | m24-1 |
| Amount of monomer (b) [g] | Initial: 8.5 g Continuous addition at 1 g/hr | 62.6 |
| Type of monomer (c) | m31-2 | m32-1 |
| Amount of monomer (c) [g] | 13.0 | 32.4 |
| Initiator | i-2 | i-3 |
| Amount of initiator [mg] | 25.3 | 70.7 |
| Polymer temperature [° C.] | 100 | 40 |
| Pressure [MPaG] | 0.30 Continuous addition of TFE under a constant pressure | 0.10 Continuous addition of TFE under a constant pressure |
| Polymerization time [hr] | 10 | 10 |
| Yield [g] | 19.8 | 24.4 |
| Proportion of unit (A) [mol %] | 23 | 24 |
| Proportion of unit (B) [mol %] | 45 | 60 |
| Proportion of unit (C) [mol %] | 3 | 12 |
| Proportion of TFE unit [mol %] | 29 | 4 |
| Polymer (H) | H-15 | H-16 |
| Ion exchange capacity [meq/g] | 1.0 | 1.3 |

TABLE 4

| | Ex. 17 | Ex. 18 | Ex. 19 | Ex. 20 | Ex. 21 | Ex. 22 |
|---|---|---|---|---|---|---|
| Polymer (F) | F-17 | F-18 | F-19 | F-20 | F-21 | F-22 |
| Autoclave [mL] | 230 | 230 | 230 | 495 | 230 | 230 |
| Type of monomer (a) | m12-1 | m12-1 | m12-1 | m11-1 | m11-1 | m12-1 |
| Amount of monomer (a) [g] | 56.3 | 635.7 | 240.4 | 428.2 | 139.7 | 194.2 |
| Type of monomer (b) | m21-1 | m21-1 | m21-1 | m21-1 | — | m21-1 |
| Amount of monomer (b) [g] | 16.5 | 191.0 | 39.0 | 63.5 | — | 26.4 |
| Type of monomer (c) | — | — | — | — | m31-2 | m3' |
| Amount of monomer (c) [g] | — | — | — | — | 35.7 | 95.6 |
| Initiator | i-2 | i-2 | i-1 | i-2 | i-1 | i-1 |
| Amount of initiator [mg] | 24 | 291 | 84 | 148 | 70 | 95 |
| Polymer temperature [° C.] | 40 | 40 | 18 | 40 | 30 | 1 |
| Pressure [MPaG] | 0.52 | 0.35 | 0.10 | 0.19 | 0.35 Continuous addition of TFE under a constant pressure | 0.04 |
| Polymerization time [hr] | 24 | 24 | 24 | 24 | 8 | 90 |
| Yield [g] | 23.5 | 240.6 | 49.6 | 79.5 | 12.5 | 24.0 |
| Proportion of unit (A) [mol %] | 15 | 14 | 20 | 30 | 22 | 18 |
| Proportion of unit (B) [mol %] | 52 | 57 | 57 | 48 | — | 50 |
| Proportion of unit (C) [mol %] | — | — | — | — | 13 | 20 |
| Proportion of TFE unit [mol %] | 33 | 29 | 23 | 22 | 65 | 12 |
| Polymer (H) | H-17 | H-18 | H-19 | H-20 | H-21 | H-22 |
| Ion exchange capacity [meq/g] | 1.2 | 1.1 | 1.4 | 1.1 | 1.1 | 1.1 |

TABLE 5

| Ex. No. | Liquid composition | Catalyst layer for cathode | Cracking of catalyst layer | Power generation characteristics |
|---|---|---|---|---|
| 1 | D-1 | E-1 | ◯ | ◯ |
| 2 | D-2 | E-2 | ◉ | ◯ |
| 3 | D-3 | E-3 | ◉ | ◉ |
| 4 | D-4 | E-4 | ◉ | ◉ |
| 5 | D-5 | E-5 | ◉ | ◉ |
| 6 | D-6 | E-6 | ◯ | ◯ |
| 7 | D-7 | E-7 | ◯ | ◯ |
| 8 | D-8 | E-8 | ◉ | ◯ |
| 9 | D-9 | E-9 | ◉ | ◉ |
| 10 | D-10 | E-10 | ◯ | ◯ |
| 11 | D-11 | E-11 | ◉ | ◉ |
| 12 | D-12 | E-12 | ◯ | ◯ |
| 13 | D-13 | E-13 | ◉ | ◯ |
| 14 | D-14 | E-14 | ◉ | Δ |
| 15 | D-15 | E-15 | ◯ | ◯ |
| 16 | D-16 | E-16 | ◉ | Δ |
| 17 | D-17 | E-17 | X | ◯ |
| 18 | D-18 | E-18 | X | ◉ |
| 19 | D-19 | E-19 | X | ◉ |
| 20 | D-20 | E-20 | X | ◯ |
| 21 | D-21 | E-21 | ◯ | X |
| 22 | D-22 | E-22 | X | ◯ |

INDUSTRIAL APPLICABILITY

The electrolyte material of the present invention is useful as an electrolyte material for a polymer electrolyte fuel cell. Further, it is also useful for other applications (such as a proton permselective membrane to be used for water electrolysis, hydrogen peroxide production, ozone production or waste acid recovery; a diaphragm for electrolysis of sodium chloride or a redox flow cell, or a cation exchange membrane for electrodialysis to be used for desalination or salt production).

REFERENCE SYMBOLS

10: membrane/electrode assembly
11: catalyst layer
12: gas diffusion layer
13: anode
14: cathode
15: polymer electrolyte membrane
16: carbon layer

What is claimed is:

1. An electrolyte material, which comprises a polymer (H) having
- a unit (A) which has an ion exchange group and in which all hydrogen atoms (excluding $H^+$ of the ion exchange group) bonded to carbon atoms are substituted by fluorine atoms,
- a unit (B) which has a 5-membered ring and in which all hydrogen atoms bonded to carbon atoms are substituted by fluorine atoms, and
- a unit (C) which has neither an ion exchange group nor a ring structure, has an ether bond, and has an ether equivalent of at most 350 as established by the following formula (I) and in which all hydrogen atoms bonded to carbon atoms are substituted by fluorine atoms:

Ether equivalent=the molecular weight of the monomer forming the unit (C)/the number of ether bonds in the monomer forming the unit (C)   (I), wherein at least one type of the unit (A) is a unit having a group represented by the following formula (g1):

(g1)

wherein $Q^{21}$ is a perfluoroalkylene group which may have an etheric oxygen atom, $Q^{22}$ is a single bond or a perfluoroalkylene group which may have an etheric oxygen atom, $Y^2$ is a fluorine atom or a monovalent perfluoro organic group, $R^{f2}$ is a perfluoroalkyl group which may have an etheric oxygen atom, $X^2$ is an oxygen atom, a nitrogen atom or a carbon atom, provided that when $X^2$ is an oxygen atom, b=0, when $X^2$ is a nitrogen atom, b=1, and when $X^2$ is a carbon atom, b=2.

2. The electrolyte material according to claim 1, wherein at least one type of the unit (C) is one member selected from the group consisting of a unit represented by the following formula (u31), a unit represented by the following formula (u32) and a unit represented by the following formula (u33):

(u31)

(u32)

(u33)

wherein v is an integer of from 0 to 3, w is 1 or 2, x is an integer of from 0 to 2, y is 1 or 2, and z is an integer of from 0 to 2.

3. The electrolyte material according to claim 1, wherein the proportion of the unit (C) is from 1 to 30 mol % in all units (100 mol %) constituting the polymer (H).

4. The electrolyte material according to claim 1, wherein at least one type of the unit (B) is a unit represented by the following formula (u21):

(u21)

wherein each of $R^{11}$ and $R^{12}$ which are independent of each other, is a fluorine atom or a $C_{1-5}$ perfluoroalkyl group, and each of $R^{13}$ and $R^{14}$ which are independent of each other, is a fluorine atom, a $C_{1-5}$ perfluoroalkyl group or a $C_{1-5}$ perfluoroalkoxy group.

5. The electrolyte material according to claim 4, wherein each of $R^{13}$ and $R^{14}$ is a fluorine atom.

6. The electrolyte material according to claim 4, wherein at least one type of the unit represented by the formula (u21) is a unit represented by the following formula (u21-1):

(u21-1)

7. The electrolyte material according to claim 1, wherein at least one type of the unit (A) is a unit represented by the following formula (u12):

(u12)

wherein q is 0 or 1.

8. The electrolyte material according to claim 1 wherein each of $Q^{21}$ and $Q^{22}$ which are independent of each other, is a $C_{1-6}$ perfluoroalkylene group which may have an etheric oxygen atom.

9. The electrolyte material according to claim 8, wherein at least one of $Q^{21}$ and $Q^{22}$ is a $C_{1-6}$ perfluoroalkylene group which has an etheric oxygen atom.

10. The electrolyte material according to claim 1, wherein the polymer (H) further has a unit derived from tetrafluoroethylene.

11. A liquid composition comprising a dispersion medium and the electrolyte material as defined in claim 1 dispersed in the dispersion medium, wherein the dispersion medium contains an organic solvent having a hydroxy group.

12. A membrane/electrode assembly for a polymer electrolyte fuel cell, which comprises
- an anode having a catalyst layer containing a proton conductive polymer,
- cathode having a catalyst layer containing a proton conductive polymer, and
- polymer electrolyte membrane disposed between the anode and the cathode, wherein the proton conductive polymer contained in the catalyst layer of at least one of the cathode and the anode is the electrolyte material as defined in claim 1.

* * * * *